United States Patent
Grimes

(10) Patent No.: US 8,381,500 B2
(45) Date of Patent: Feb. 26, 2013

(54) AQUATIC WEED HARVESTER

(76) Inventor: John Grimes, Wellington, FL (US)

( * ) Notice: Subject to any disclaimer, the term of this patent is extended or adjusted under 35 U.S.C. 154(b) by 430 days.

(21) Appl. No.: 12/578,857

(22) Filed: Oct. 14, 2009

(65) Prior Publication Data

US 2010/0089016 A1     Apr. 15, 2010

Related U.S. Application Data

(60) Provisional application No. 61/105,731, filed on Oct. 15, 2008.

(51) Int. Cl.
*A01D 44/00* (2006.01)
(52) U.S. Cl. ............................................................ 56/8
(58) Field of Classification Search .................. 56/8, 9
See application file for complete search history.

(56) References Cited

U.S. PATENT DOCUMENTS

| | | | | |
|---|---|---|---|---|
| 74,857 A | * | 2/1868 | Sink ................................ | 37/315 |
| 97,420 A | * | 11/1869 | Mayhew ......................... | 37/316 |
| 319,352 A | * | 6/1885 | Trahern .............................. | 56/8 |
| 1,200,206 A | * | 10/1916 | Knapp ............................ | 52/261 |
| 4,040,864 A | * | 8/1977 | Steeves ............................. | 134/6 |
| 4,894,943 A | * | 1/1990 | Allen et al. ...................... | 43/6.5 |
| 5,024,009 A | * | 6/1991 | Kirkman ......................... | 37/316 |
| 5,235,797 A | * | 8/1993 | Sygen et al. ........................ | 56/9 |
| 5,775,073 A | * | 7/1998 | Kelpin et al. ....................... | 56/8 |

* cited by examiner

*Primary Examiner* — Thomas B Will
*Assistant Examiner* — Mai Nguyen
(74) *Attorney, Agent, or Firm* — Dowell & Dowell, P.C.

(57) ABSTRACT

An aquatic weed harvester includes an open frame and a tubular mesh harvesting material that is secured to the open frame via a series of hooks disposed about the harvesting frame. The frame can be secured to a bow of a floatable structure or vessel via a variety of configurations, such as a pair of mounting channels or a rotating frame assembly. The rotating frame assembly allows the user to rotate the harvester between an in use orientation and a stored orientation. When placed in a stored orientation, the harvester opening is rotated upwards aiding the user in sealing the harvesting bag. The vessel preferably is designed having a split bow, where the weed harvester is positioned between the two bow extensions.

8 Claims, 10 Drawing Sheets

AQUATIC WEED HARVESTER

CROSS-REFERENCE TO RELATED APPLICATION

This Non-Provisional Utility application claims the benefit of U.S. Provisional Patent Application Ser. No. 61/105,731, filed on Oct. 15, 2008, which is incorporated herein in its entirety.

FIELD OF THE INVENTION

The present invention relates to aquatic weed harvesters, and more particularly, to an aquatic weed harvester having a box shaped frame supporting a fork like retriever with a series of hooks for connection to a mesh collection bag.

BACKGROUND OF THE INVENTION

Aquatic weeds thrive in bodies of still water, such as ponds, lakes, and the like. The weeds can grow, replicate, and decompose blocking waterways. These weeds, algae, and similar growths can affect the health of people and animals, becoming a detriment to activities such as swimming, boating, fishing, and the like.

The collection of aquatic weeks is often referred to as harvesting. Harvesting is known, utilizing pontoons or large, expensive catamaran barges using paddle wheel, fossil fuel propulsion systems. The harvesters utilize power driven weed cutters and conveyors. The cutters sheer sections of the weeds for removal. The conveyors collect the weeds from the water and are later used for offloading the harvested weeds.

Accordingly, there remains a need in the art for a cost effective weed harvester capable of removing the excessive growth of aquatic weeds, algae, and similar growths.

SUMMARY OF THE INVENTION

The present invention overcomes the deficiencies of the known art and the problems that remain unsolved by providing an aquatic weed harvesting apparatus and respective method.

In accordance with one embodiment of the present invention, there is provided an aquatic weed harvesting apparatus comprising a frame structure having a peripheral shape forming an opening therethrough. A series of hooks are disposed upon the frame providing a means for securing a material for skimming and harvesting the aquatic growths.

In one aspect, the harvester comprises a tubular open frame for mounting proximate a bow of a vessel.

Yet another aspect provides a tubular mesh material that is secured to the open frame via a series of hooks disposed upon the frame.

While another aspect mounts the tubular open frame to the bow of the vessel via a pair of mounting channels.

With yet another aspect mounts the tubular open frame to a pivoting frame assembly providing an alternate mounting means.

Regarding another aspect, the mesh net provides a skimming ability by at least one of tying a knot in the tubular mesh material, tying a rope (or similar) around the tubular mesh material, and clamping the tubular mesh material using an integrated clamping system.

In yet another aspect, harvester utilizes a twin hull vessel, such as a catamaran, a pontoon boat, and the like.

In another aspect, the harvester can utilize a conveyor system for feeding weeds into the skimmer.

Yet another aspect incorporates a flush deck conversion, which provides a platform covering a passenger portion of the vessel.

Continuing with another recognized aspect of the present invention, the harvester provides a lightweight, small aquatic weed retriever that can be easily stored, moved, and launched. The harvester is quiet and non-polluting.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
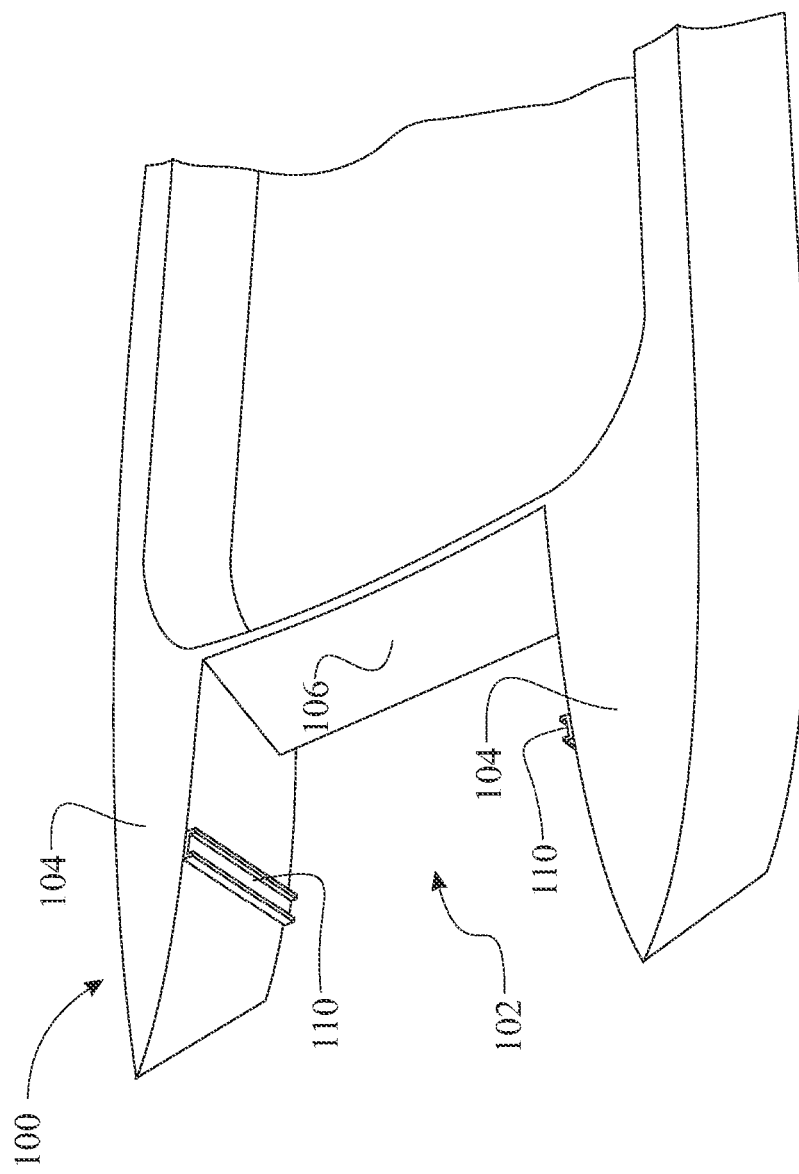
FIG. 1 presents an isometric view of a vessel bow incorporating mounting channels for an aquatic weed harvester.
Figure 2:
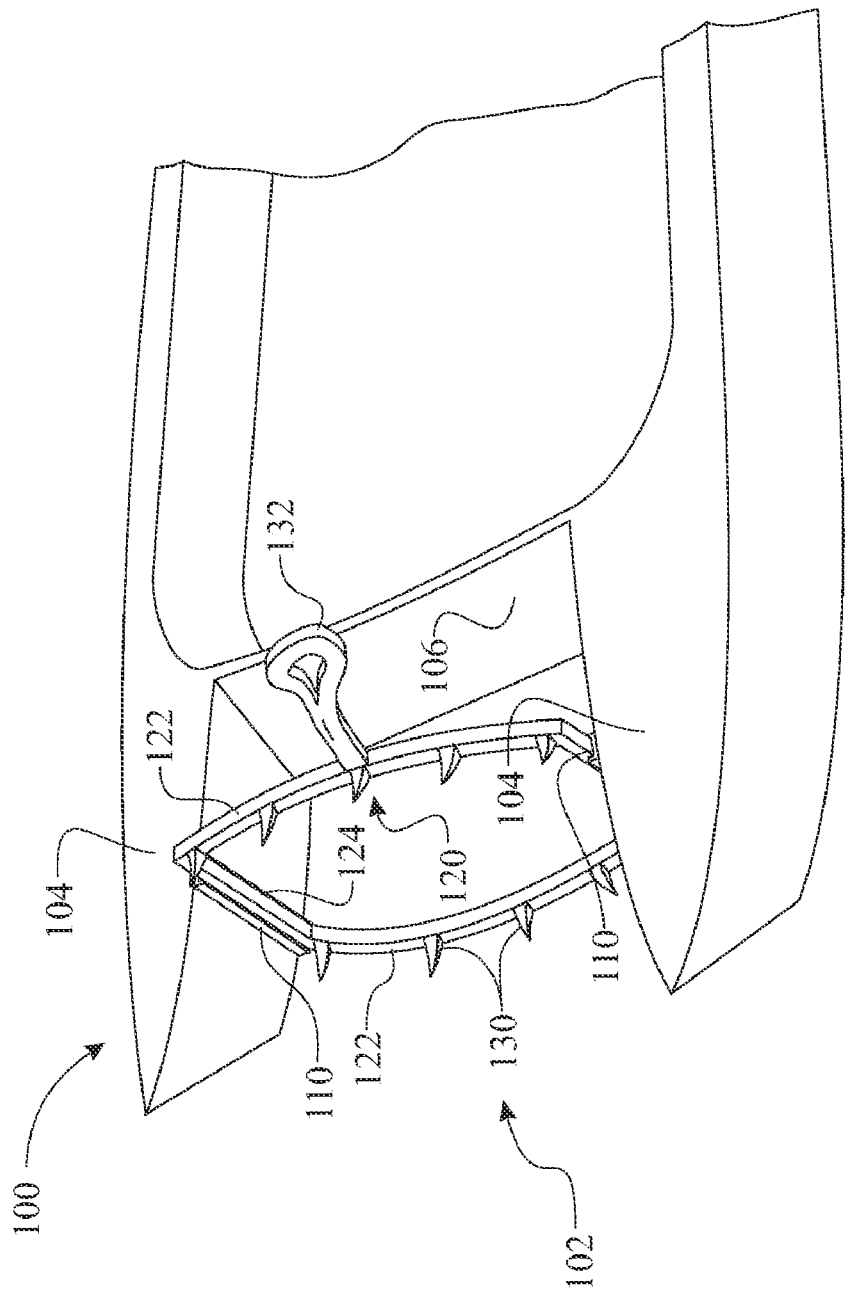
FIG. 2 presents an isometric view of a vessel bow incorporating an aquatic weed harvester frame mounted in the mounting channels.
Figure 3:
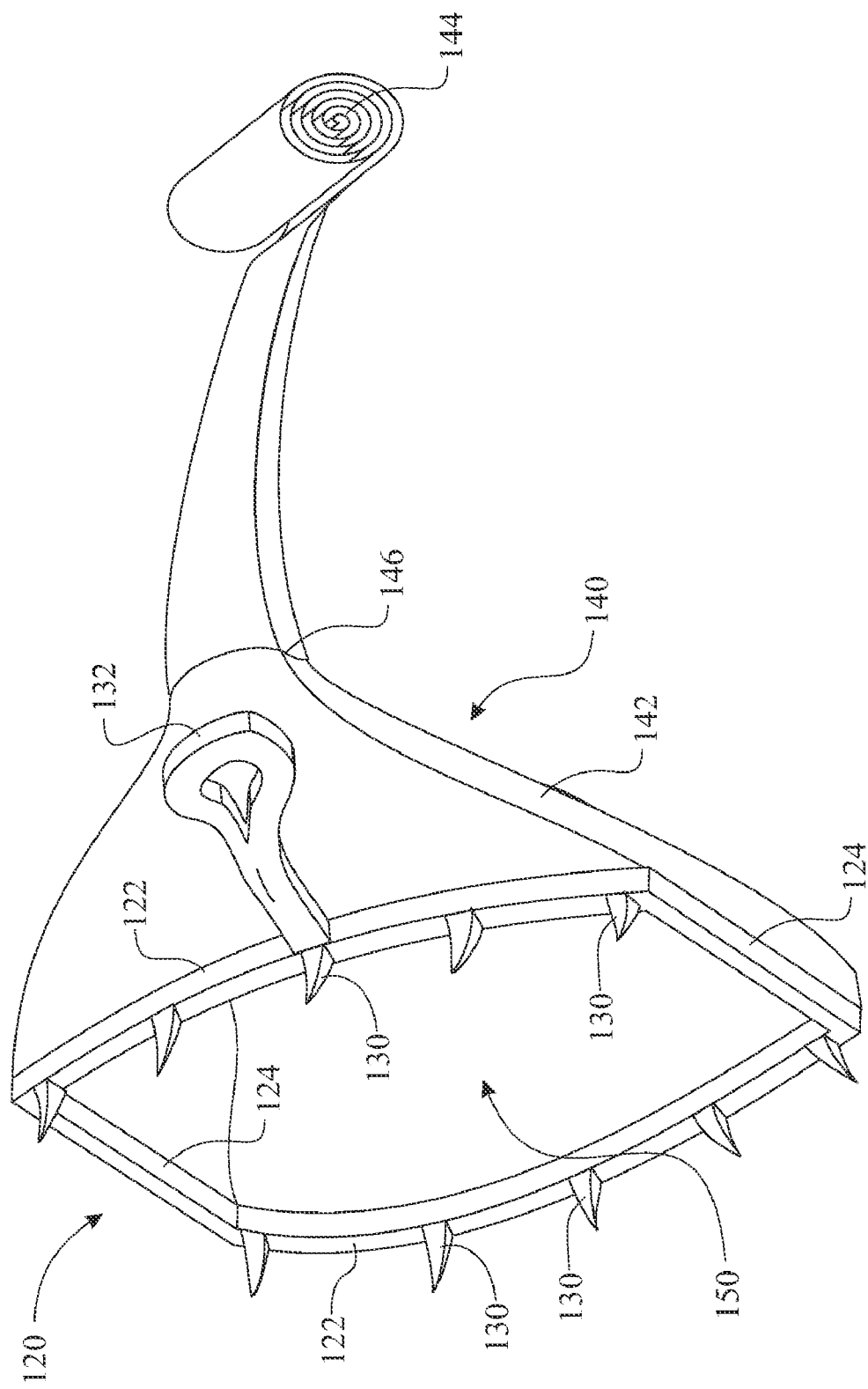
FIG. 3 presents an isometric view of an aquatic weed harvester assembly incorporating the skimming mesh.
Figure 4:
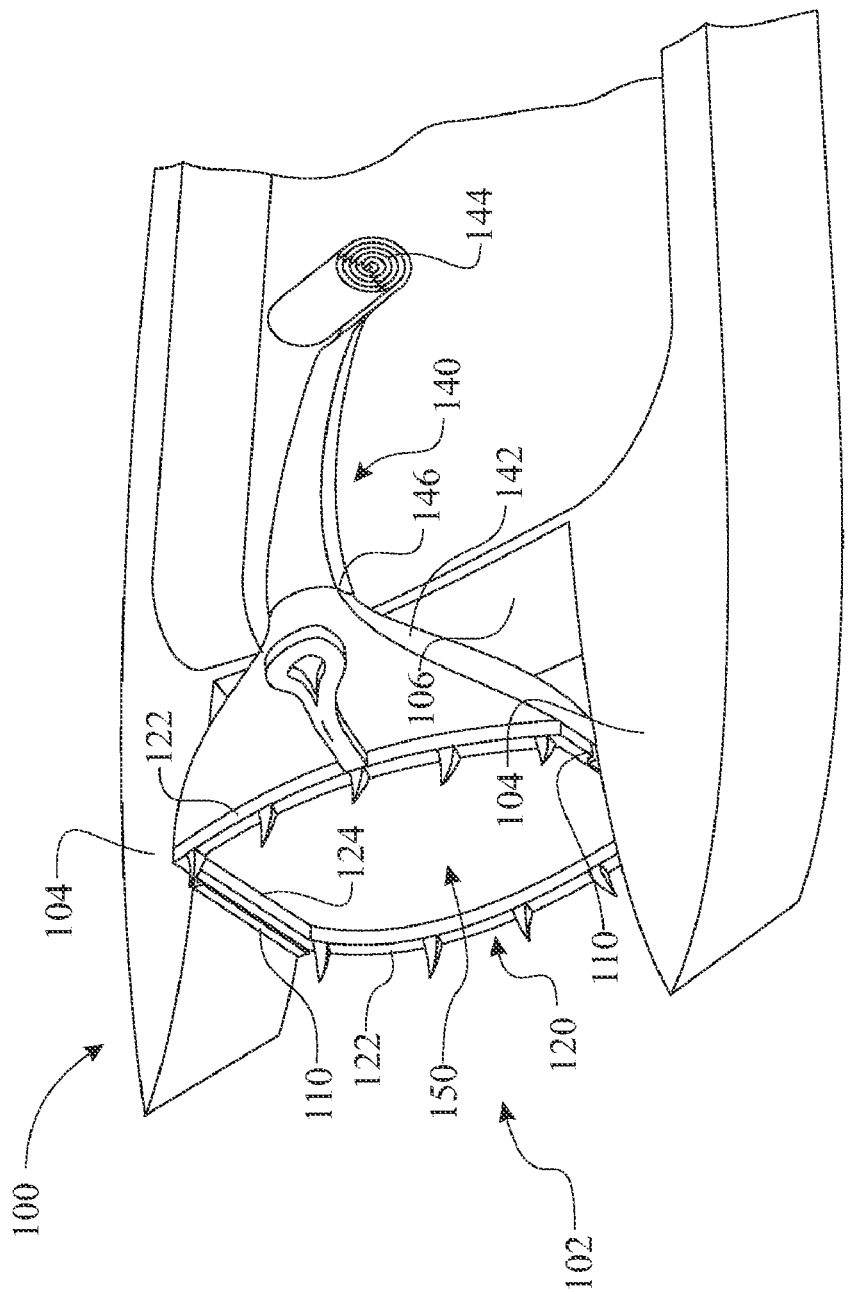
FIG. 4 presents an isometric view of a vessel bow incorporating an aquatic weed harvester frame incorporating the skimming mesh.
Figure 5:
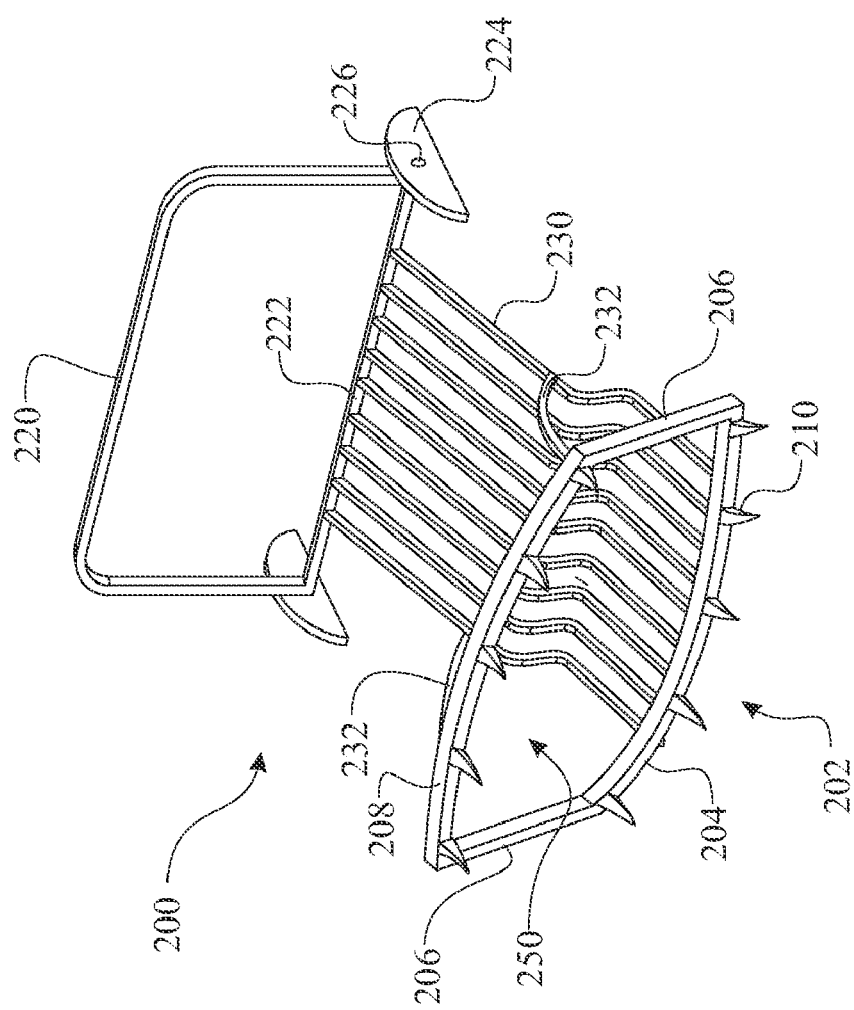
FIG. 5 presents an isometric view of a weed harvester portable frame assembly.
Figure 6:
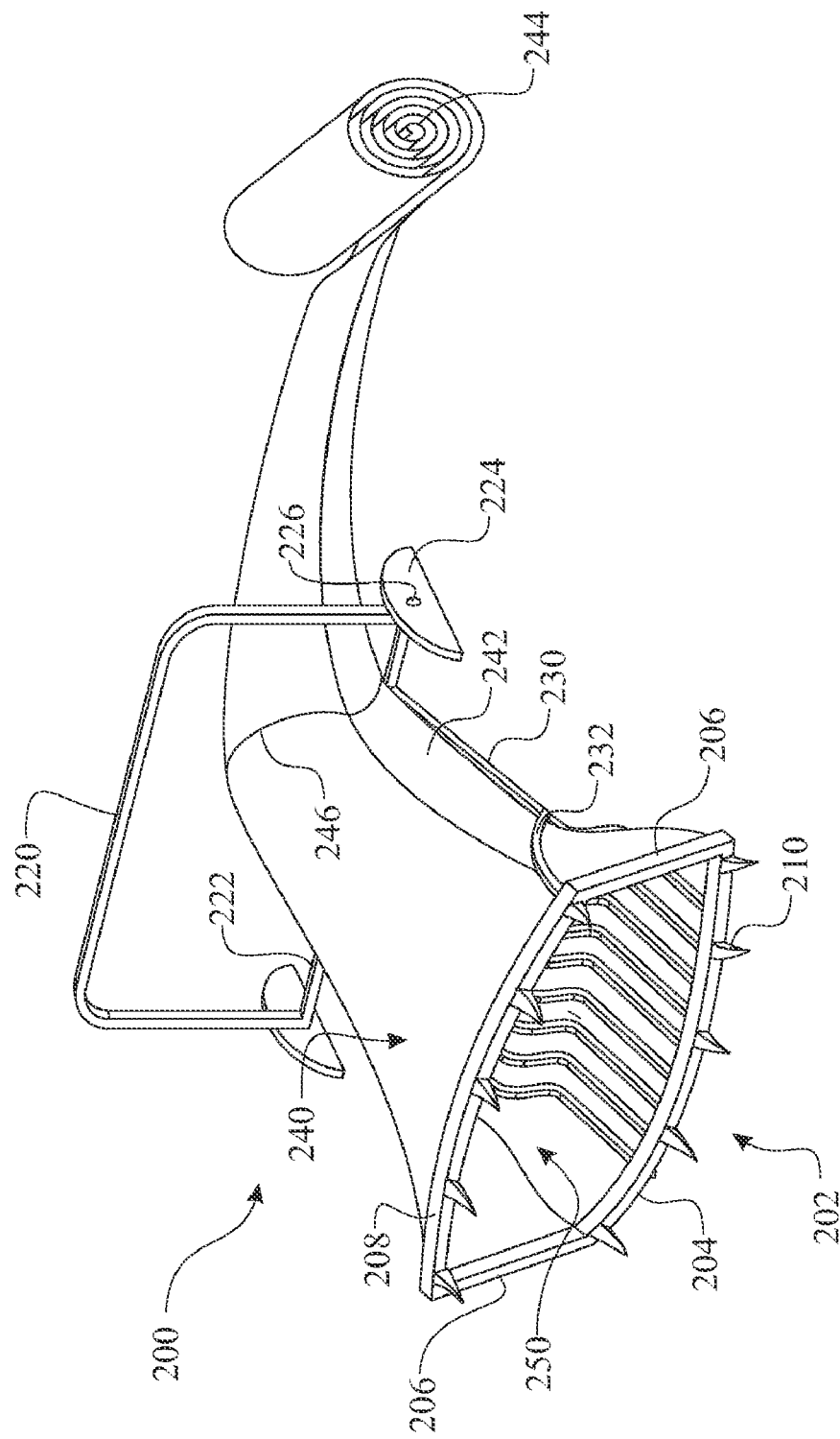
FIG. 6 presents an isometric view of a weed harvester portable frame assembly incorporating the skimming mesh.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of the present invention is represented as an aquatic weed harvester providing descriptive illustrations shown in FIGS. 1 through 4. The weed harvester is mounted within a bow of a twin hull vessel 100 via a pair of weed harvester mounting channel 110. The twin hull vessel 100 is fabricated having a pair of amas 104 (hulls) having a platform 106 spanning there between. A leading edge of the platform 106 is preferably aft of the bow, providing an alcove. The platform 106 is generally elevated from the bottom of the amas 104, forming a center tunnel 102. The weed harvester mounting channels 110 are disposed on each inner wall of the amas 104, located opposing each other.

The weed harvester assembly includes a weed harvester frame 120. The weed harvester frame 120 is formed having a pair of mounting frame members 124 extending vertically with a transverse frame members 122 spanning between each of an upper end of the mounting frame members 124 and each end of a lower end of the mounting frame members 124. The weed harvester frame 120 is preferably formed of aluminum tubing, and can be formed in any reasonable geometry. A series of mesh securing hooks 130 are disposed about the frame member for securing a weed collecting mesh 140. An optional handle 132 can be assembled to the transverse frame members 122 for aiding the operator during use. A weed collecting section 142 is formed of a section of weed collecting mesh 140, provided via a con web net roll 144. The open end of the weed collecting section 142 is secured to the weed harvester frame 120 via the series of mesh securing hooks 130. The mesh securing hooks 130 can be of any reasonable form factor and orientation known by those skilled in the art. The operator would form a closed weed collecting section 142 via providing a knot 146 in the weed collecting mesh 140 at a reasonable distance from the weed harvester frame 120. Alternately, the operator can tie a rope (or similar) about the weed collecting mesh 140. The operator would propel the twin hull vessel 100 forward forcing the aquatic weeds through a mesh collection opening 150 and into the weed collecting section 142. Excess water flows through the weed collecting mesh 140, leaving the desired weeds. The vessel can be self-propelled via a motor or other propulsion means, or pulled via another vehicle or manually via the operator.

An alternate embodiment provides a portable assembly, referred to as a weed harvesting assembly 200 and detailed in descriptive illustrations shown in FIGS. 5 through 9. The weed harvesting assembly 200 includes a weed harvester mesh support frame 202 and a frame lever 220, interconnected via a plurality of harvester extension frame members 230 extending there between. The harvester extension frame members 230 are assembled to a mounting frame member 204 of the weed harvester mesh support frame 202. The harvester extension frame members 230 are strategically located along the lower portion of the assembly, providing support to a tubular mesh material 242. A harvester frame support arm 232 provides additional stability to the weed harvester mesh support frame 202, extending between the harvester extension frame members 230 and an upper edge of the weed harvester mesh support frame 202. The weed harvester mesh support frame 202 forms an open frame having a pair of vertical frame members 206 disposed on each vertical edge, the mounting frame member 204 spanning between each of the lower corners of the vertical frame members 206 and a upper transverse frame member 208 spanning between each of the upper corners of the vertical frame members 206. A series of mesh mounting hooks 210 are disposed about the weed harvester mesh support frame 202. The harvester extension frame members 230 are assembled to a lower lever member 222 of the frame lever 220. A pair of frame mounts 224 is pivotally assembled to each lower corner of the frame lever 220 via a frame pivot pin 226. This configuration allows the user to pivot the assembly between an in use orientation and a stored configuration.

A weed collection mesh 240 is utilized to form a tubular mesh material 242. A tubular mesh material 242 is formed of a section of weed collection mesh 240, provided via a con web net roll 244, for skimming the water and collecting the aquatic weeds, plants, and the like. The open end of the tubular mesh material 242 is secured to the weed harvester mesh support frame 202 via the series of mesh mounting hooks 210. This forms a skimming mesh opening 250 for collecting the aquatic flora, weeds, and the like. The harvesting material coupler can be mesh mounting hooks 210 (as presented) or can be of any other reasonable form factor, configuration, and orientation known by those skilled in the art. The operator would form a closed tubular mesh material 242 via providing a knot 246 in the weed collection mesh 240 at a reasonable distance from the weed harvester mesh support frame 202. Alternately, the operator can tie a rope (or similar) about the weed collection mesh 240. The tubular mesh material 242 is supported via the harvester extension frame members 230 and the harvester frame support arm 232. Upon completion of the skimming process, the operator can rotate the frame lever 220, thus turning the tubular mesh material 242 into a vertical orientation. This can aid in sealing the aquatic weeds within the tubular mesh material 242 and allowing the operator to seal the tubular mesh material 242.

Figure 7:
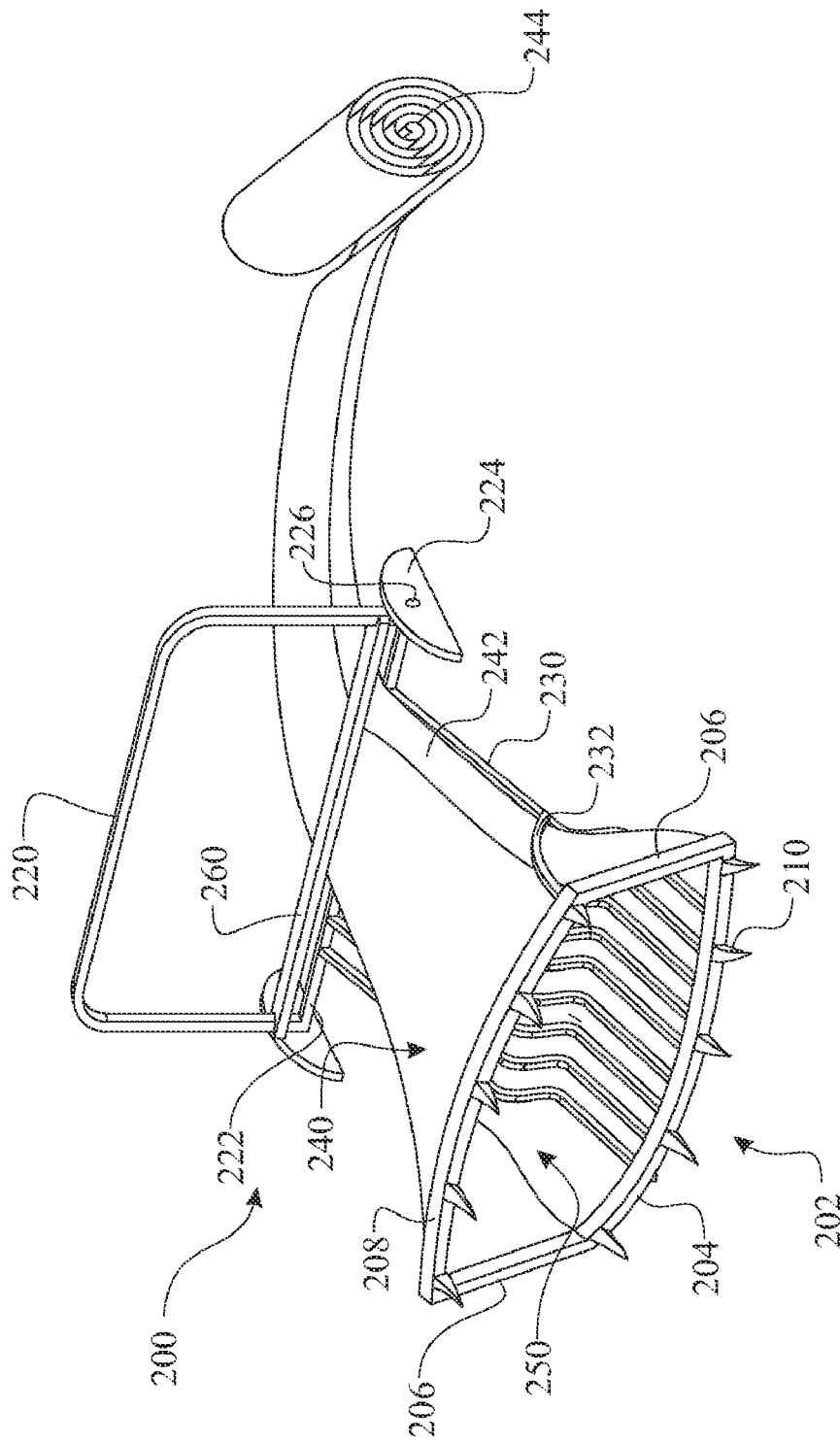
FIG. 7 presents an isometric view of a weed harvester portable frame assembly incorporating the skimming mesh, utilizing a clamping bar to create a skimming bag section.

A clamping bar 260 can be used, replacing the requirement of the knot 246 or rope for forming the tubular mesh material 242, as illustrated in FIG. 7. The clamping bar 260 would clamp the weed collection mesh 240 against the lower lever member 222. The clamping bar 260 can be secured in a clamping position via any of a variety of known means.

The weed harvesting assembly 200 is mounted to the twin hull vessel 100 such as via securing the frame mounts 224 to the amas 104. The frame pivot pin 226 allows the weed harvester mesh support frame 202 to pivot in accordance with a weed harvester rotation 270. The weed harvester mesh support frame 202 is initially rotated into a collection orientation (FIG. 8) for harvesting weeds, wherein the harvester extension frame members 230 rests against the hull 101. It is understood that a bumper or any other form of resting interface can be provided to avoid damage of either of the two components. The weed harvester mesh support frame 202 is then rotated in accordance with the weed harvester rotation 270 into a bag loading orientation (FIG. 9) shown in phantom lines. The frame lever 220 is rotated into a position references as a bag filling frame lever position 221, lifting the harvester extension frame members 230 from the water and towards a positioned referenced as a bag filling harvester frame position 231. The weed harvester rotation 270 aids in transferring harvested weeds from the water surface 160 into the weed collection mesh 240.

The assembly is preferably formed of lightweight aluminum for ease of use and portability. The assembly is designed to be used extending from a bow of a floating structure. The frame weed harvester mesh support frame 202 can be of any reasonable shape for both the harvesting application and structural rigidity. The mesh 140, 240 can be of a material suitable for the harvesting application including wire, plastics such as polypropelene, nylon or similar as well as natural materials such as jute, hemp, cotton or paper, and the like. It would be preferable that the material be disposable and biodegradable.

Clips or any other mechanical fastening form factor can be used for the exemplary hooks 130, 210.

Figure 9:
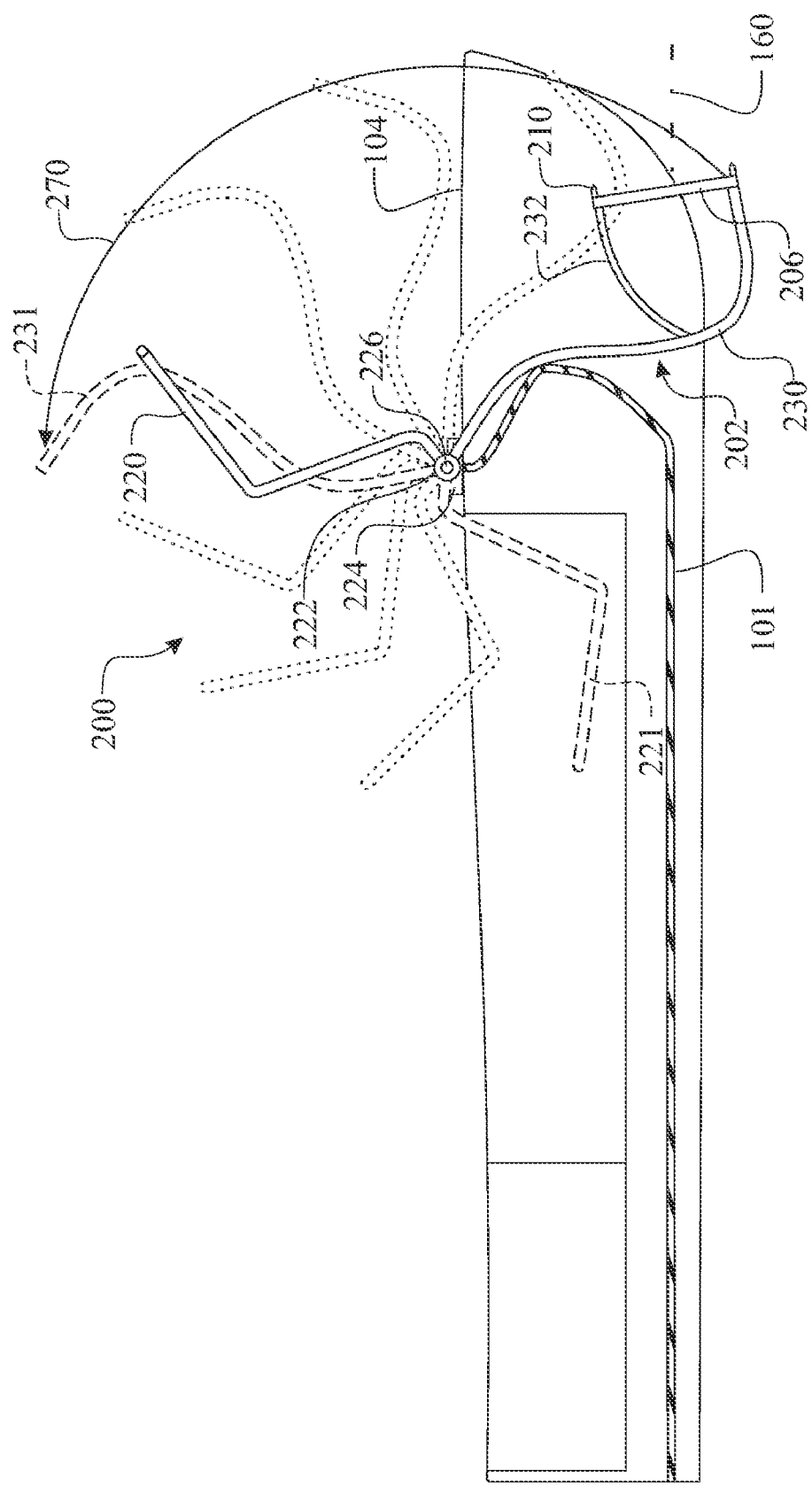
FIG. 9 presents a sectioned elevation view of FIG. 8, further illustrating the rotating motion of the pivoting harvester assembly.
Figure 10:
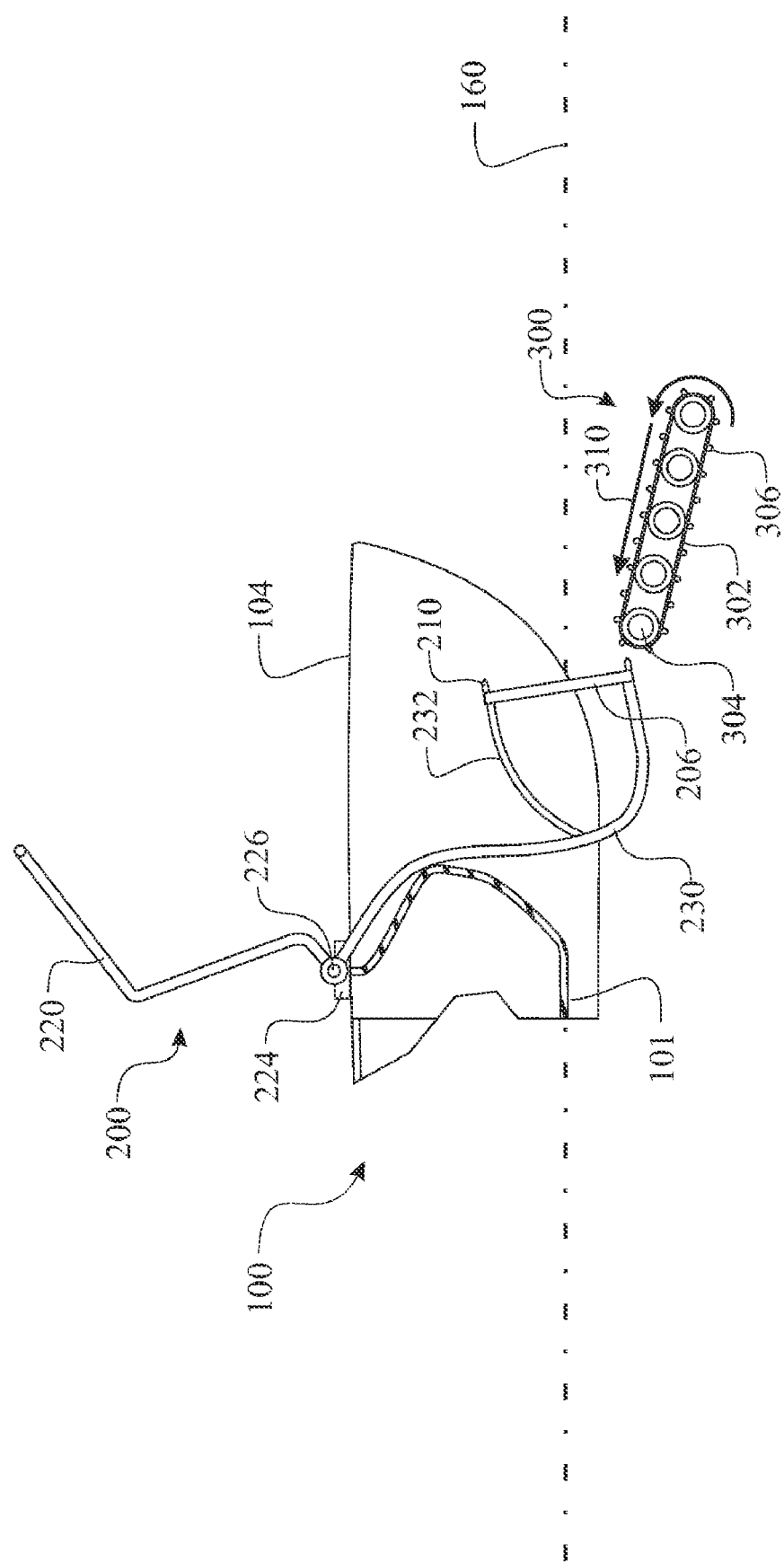
FIG. 10 presents a bow portion of the sectioned elevation view of FIG. 8, introducing a weed lead-in conveyor system.

A conveyor loading system 300 can be provided slightly forward of the vertical frame members 206 of the weed harvesting assembly 200, as illustrated in FIG. 10. The conveyor loading system 300 is secured to the twin hull vessel 100 via any reasonable mechanical design, preferably being a detachable means. The conveyor loading system 300 includes a conveyor belt 302 provided about a series of conveyor roller 304, wherein at least one conveyor roller 304 is driven by a motor causing the conveyor belt 302 to move in accordance with a belt rotation 310. A portion of the conveyor roller 304 can be free spinning, simply providing support for the conveyor belt 302. A plurality of weed gripping element 306 can be disposed upon an outer surface of the conveyor belt 302, further aiding in the gathering process of the weeds. The plurality of weed gripping element 306 increases the friction or mechanical gripping of the weeds. The weed gripping element 306 can be provided in any of a variety of shapes, including a bump (as shown), a series of bumps, a bar, a hook, and the like. When powered, the conveyor roller 304 rotates, driving the conveyor belt 302 to move in accordance with the belt rotation 310. Either friction of the conveyor belt 302 or the series of weed gripping element 306 engage with the weeds, directing them into the weed harvesting assembly 200. Once a reasonable quantity of weeds is gathered within the weed collection mesh 240 (FIG. 7), the weed harvester mesh support frame 202 is rotated in accordance with the weed harvester rotation 270 (FIG. 9). The conveyor loading system 300 allows for gathering of weeds that would normally be missed because they are heavier and might be floating below the lower edge of the harvester extension frame members 230. In a modified embodiment, the conveyor can be provided to lift the weeds from the water to transfer them upwards into the tubular mesh material 242. The tubular mesh material 242 can be held via the weed harvester mesh support frame 202, wherein the weed harvester mesh support frame 202 can be partially submerged or positioned completely above the waterline, including within the boat. The conveyor loading system 300 can be of any shape and design to support the configuration of the overall system.

Figure 8:
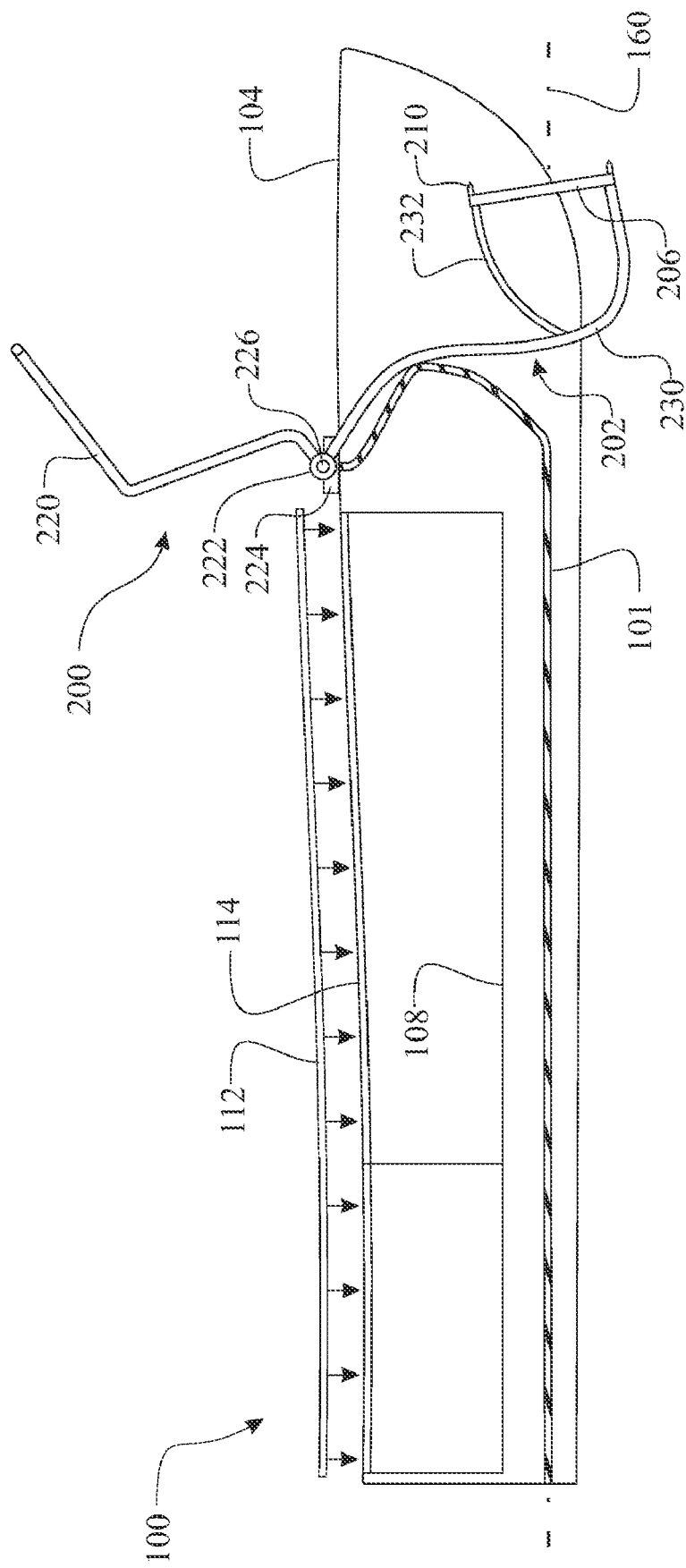
FIG. 8 presents a sectioned elevation view taken along a longitudinal centerline of the vessel, the figure illustrating a deck conversion and the pivoting harvester assembly of FIG. 5.

The twin hull vessel 100 can include a variety of features. A flush deck conversion 112 can be provided for placement over the deck 108, being placed upon a deck conversion support flange 114 as illustrated in FIG. 8. The flush deck conversion 112 provides a planar upper deck surface, allowing water and other objects to flow back into the water. A railing (not shown) can be assembled to either the flush deck conversion 112 or the upper edge of the hull gunwale. The illustrated twin hull vessel 100 is a catamaran or twin style hull. A third hull section can be removably coupled to the underside of the central hull section, creating a tri-hull design for improved floatation and stability. Foam can be provided within the hull cavity to improve buoyancy, particularly should the hull become damaged or capsized. The foam also has a tendency to strengthen the hull as well as lowering the center of gravity, reducing the potential for becoming capsized. The flush deck conversion 112 can alternately be shaped for conversion and use in conjunction with other operations, such as fishing, hunting, surveying, and the like.

It is understood there are a variety of means for mounting the weed harvesting assembly 120, 200 to any floating vessel. A harvester assembly fastener can be of any reasonable form factor for securing the weed harvesting assembly 120, 200 to any floating vessel, not limited to the weed harvester mounting channel 110 and the frame mounts 224 taught herein.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An aquatic weed harvester assembly comprising:
   a floating vessel;
   a mesh support frame including a plurality of frame members defining an opening;
   a harvester assembly fastener for securing the mesh support frame to the floating vessel;
   an elongated supply of flexible mesh material, the flexible mesh material including a side wall having an open first end, a second end, and an intermediate portion extending between the first and second end;
   a harvesting material coupler securing the open first end of the flexible mesh material to the opening of the mesh support frame;
   a pivot assembly connected to the mesh support frame via at least one frame extension member, wherein the pivot assembly is configured to pivot the mesh support frame between a lowered position wherein the opening of the mesh support frame is substantially vertically aligned such that aquatic matter adjacent the floating vessel can enter the flexible mesh material through the mesh support frame opening, and a raised position wherein the opening of the mesh support frame is substantially horizontally aligned; and
   a closing means for closing the flexible mesh material along the intermediate portion thereof at a selected distance from said mesh support frame opening, thereby defining a flexible mesh container configured to be filled with aquatic matter, separated from the remaining flexible mesh material, removed from the mesh support frame, and disposed of by a user.

2. The aquatic weed harvester assembly of claim 1, wherein the pivot assembly is integrated with the harvester assembly fastener.

3. The aquatic weed harvester assembly of claim 1, the mesh support frame further comprising a frame lever, wherein the frame lever extends from the pivot assembly.

4. The aquatic weed harvester assembly of claim 1, wherein the harvesting material coupler is a series of hooks.

5. The aquatic weed harvester assembly of claim 1, wherein the floating vessel is formed having a generally flat bow section, wherein the mesh support frame is oriented in front of the generally flat bow section.

6. The aquatic weed harvester assembly of claim 1, wherein the floating vessel is a multi-hull vessel, further comprising a pair of amas located on each side of a platform, wherein the mesh support frame extends between the pair of amas.

7. The aquatic weed harvester assembly of claim 1, further comprising a conveyor loading system positioned to aid in transferring aquatic matter from water into the opening of the flexible mesh material.

8. A method for harvesting aquatic debris comprising:
securing an open first end of an elongated supply of flexible mesh material to an opening of a mesh support frame secured to a floating vessel, the opening of the mesh support frame being defined by a plurality of frame members, wherein the flexible mesh material also includes a second end and an intermediate portion extending between the first and second ends;
pivoting a pivot assembly connected to the mesh support frame via at least one frame extension member to a lowered position wherein the opening of the mesh support frame is substantially vertically aligned such that aquatic matter adjacent the floating vessel can enter the flexible mesh material through the mesh support frame opening;
inserting aquatic matter into the flexible mesh material through the mesh support frame opening;
pivoting the pivot assembly to a raised position wherein the opening of the mesh support frame is substantially horizontally aligned; and
closing the flexible mesh material along the intermediate portion thereof at a selected distance from said mesh support frame opening, creating a flexible mesh container having aquatic matter therein;
separating the container from the remaining flexible mesh material; and
removing the container from the mesh support frame.

* * * * *